United States Patent [19]

Block et al.

[11] Patent Number: 4,528,589

[45] Date of Patent: Jul. 9, 1985

[54] METHOD AND SYSTEM FOR SUBSCRIPTION TELEVISION BILLING AND ACCESS

[75] Inventors: Robert S. Block, Marina Del Ray, Calif.; John R. Martin, Milwaukee, Wis.

[73] Assignee: Telease, Inc., Los Angeles, Calif.

[21] Appl. No.: 575,761

[22] Filed: Feb. 1, 1984

Related U.S. Application Data

[60] Continuation of Ser. No. 365,498, Apr. 5, 1982, abandoned, which is a continuation of Ser. No. 190,657, Sep. 25, 1980, abandoned, which is a division of Ser. No. 920,846, Jun. 30, 1978, Pat. No. 4,225,884, which is a continuation-in-part of Ser. No. 768,404, Feb. 14, 1977, Pat. No. 4,163,254.

[51] Int. Cl.³ ............................................. H04N 7/16
[52] U.S. Cl. .................................... 358/122; 358/84; 358/117; 358/123
[58] Field of Search ........... 358/84, 114, 117, 122–124

[56] References Cited

U.S. PATENT DOCUMENTS

| | | | |
|---|---|---|---|
| 3,777,053 | 12/1973 | Wittig et al. | 358/117 |
| 3,790,700 | 2/1974 | Callais et al. | 358/84 |
| 3,919,462 | 11/1975 | Hartung et al. | 358/117 |
| 4,024,574 | 5/1977 | Nieson | 358/117 |
| 4,025,948 | 5/1977 | Loshin | 358/124 |
| 4,044,376 | 8/1977 | Porter | 358/84 |
| 4,068,264 | 1/1978 | Pires | 358/122 |
| 4,091,417 | 5/1978 | Nieson | 358/124 |
| 4,130,833 | 12/1978 | Chomet | 358/122 |

Primary Examiner—S. C. Buczinski

Attorney, Agent, or Firm—Burns, Doane, Swecker & Mathis

[57] ABSTRACT

A subscription television system and method in which billing information regarding programs actually viewed by a subscriber of the system is accumulated over non-dedicated telephone lines. A scrambled television program signal containing a block of television program material, a program identification code unique to the block of program material, and a program category code, is broadcast. The codes are preferably included in the vertical retrace interval of the video portion of the program signal and the transmitted program signal is selectively received at a subscriber station and selectively unscrambled to permit viewing of the block of program material being transmitted in response to subscriber action indicating acceptance for viewing of the block of program material. The received program category code is compared with a locally generated category code to determine whether the program is acceptable for viewing. The program identification code is detected and stored for subsequent transmission in response to the subscriber action indicating acceptance for viewing of the received block of program material.

The program identification code stored at the subscriber station is selectively accessed from a remote location over telephone lines on other than a real time basis (e.g., a periodic basis) to thereby provide billing information at the remote location as to programs actually viewed by the subscriber. The subscriber can thus be billed monthly or on some desired periodic basis for programs actually viewed during the preceding period. The billing period can be varied from the remote location to provide a means to control the number of programs which a subscriber can receive.

9 Claims, 6 Drawing Figures

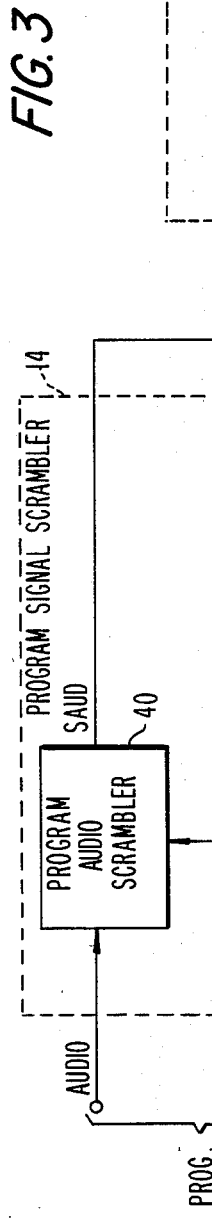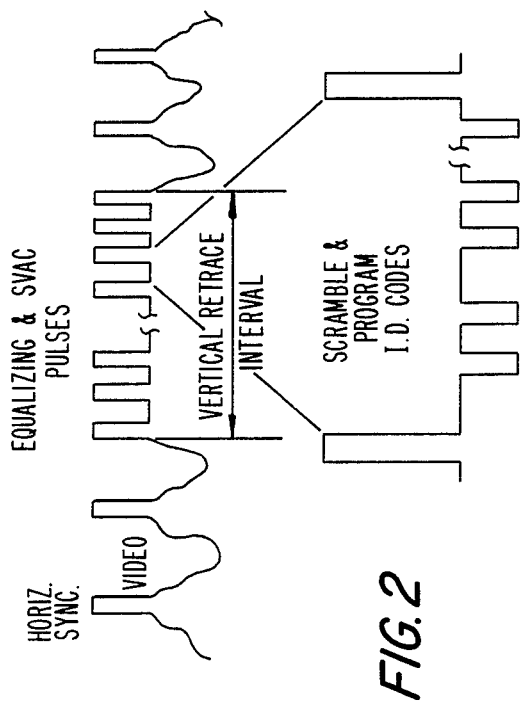

METHOD AND SYSTEM FOR SUBSCRIPTION TELEVISION BILLING AND ACCESS

This is a continuation of application Ser. No. 365,498, filed Apr. 5, 1982, now abandoned, which is a continuation of application Ser. No. 190,657, filed Sept. 25, 1980, now abandoned, which is a division of application Ser. No. 920,846, filed June 30, 1978, now U.S. Pat. No. 4,225,884, which is a continuation-in-part Ser. No. 768,404 filed Feb. 14, 1977 now U.S. Pat. No. 4,163,254.

BACKGROUND OF THE INVENTION

The present invention relates to subscription television and more particularly to a method and system for obtaining billing information regarding programs viewed by a subscriber of a subscription television system.

Since the advent of subscription or pay television, numerous techniques have been devised to bill the subscribers for the service provided. It has been suggested that the subscriber pay for subscription television services on a fixed charge basis, a uniform cost per unit use basis, or on a per program charge basis. More recent systems have adopted the per program basis for billing.

It will be appreciated that a fixed charge or uniform charge per unit basis of billing presents the least problems with regard to recording and calculating billing charges. With a fixed charge system as is used with most cable television or CATV systems, the station operator merely bills the subscriber a fixed amount on a monthly basis.

The uniform per unit use billing involves somewhat more complex procedures since actual viewing time must be recorded and somehow made available to the operator for billing purposes. Moreover, the viewing time must be registered in conjunction with the identity of each subscriber so that an individual subscriber can be billed for his viewing time.

The most complex billing system and yet the most desirable from the standpoint of the subscriber is billing on the basis of actual programs viewed with different charges for different programs. In such a system, the billing entity must know both the identity of the subscriber and the identity of the programs viewed during a billing period.

Several billing systems have been developed in order to charge subscribers to a pay television system on the basis of programs actually viewed. Typical of these types of systems are the coinbox systems that are exemplified by U.S. Pat. No. 3,021,383. In such a system, the subscriber must deposit a certain amount of money in a coinbox attached to the receiver in order to view a particular program. Different programs may be assigned different charges so that, for example, a particular movie may cost less to view than a sporting event. With such a system, payment for the program enables the viewing of a program and payment is thus assured. However, the billing entity (the system operator) must collect the money from the coinboxes on a periodic basis, requiring considerable manpower and also requiring access to the subscriber's home.

Another approach to billing on a per program basis requires the subscriber to place a telephone call to some central location and request the receipt of a particular program. The calling subscriber's equipment is then enabled and charges for the program can be recorded and billed to the calling subscriber. It will be appreciated that such a system may encounter difficulties in large service areas with a large number of subscribers. In addition, the subscriber's telephone must be utilized frequently for this purpose.

Other approaches to the billing problem in pay TV systems include the one of cards or paper tapes that are used at the subscriber location to record viewing information. In a particular system, a card is mailed to the subscriber and is required for operation of the subscriber's receiver. The card is punched or otherwise imprinted at the subscriber location to record program charges and must be mailed or otherwise transmitted to the system operator so that charges may be assessed. Typical of these types of systems are those shown in U.S. Pat. Nos. 3,470,309, 3,475,547 and 3,531,583.

Another type of billing system may be characterized as a real time metering or interrogating system such as that shown in U.S. Pat. Nos. 3,396,232, 3,716,654 and 3,733,430. These systems typically interrogate the receivers or otherwise monitor the status of the receivers on a program by program basis (e.g., through the use of special transducers) to determine if the subscriber is watching a particular program. This information can then be used for billing purposes as well as audience survey purposes and the like.

It can be seen that the foregoing systems suffer from numerous deficiencies including system complexity, enormous time consumption, reliance on subscriber action to receive billing information, and the like. It is accordingly an object of the present invention to obviate the foregoing and other deficiencies of the prior art pay television system billing procedures through the use of a novel method and system for billing on a per program basis with a minimum of complex equipment and a minimum of human intervention.

It is another object of the present invention to provide a novel method and system for obtaining billing information regarding programs actually viewed by a subscriber of a pay television system wherein program identification data is recorded and is accessed on a periodic basis from a central location, thus, eliminating the need for the gathering of the information through the intervention of the system subscriber.

It is yet another object of the present invention to provide a novel method and system for obtaining billing information regarding programs actually viewed by a pay television system subscriber which utilizes a minimum of complex equipment and makes use of existing equipment at the subscriber location including a telephone at the location.

It is a further object of the present invention to provide a novel subscriber television system and method in which scramble and program codes are received in the program video signal and are used in conjunction with a telephone access unit to unscramble the received program signal and record program viewing under the control of a central station linked to the access unit over non-dedicated telephone lines.

It is another object of the present invention to provide a novel subscriber television system and method in which the subscriber has the capability to select a program for viewing from among a number of different available programs and selectively prevent the viewing of others of the available programs.

It is yet a further object of the present invention to provide a novel subscriber television system and method in which the length of the billing period can be varied to provide flexibility in the control of programs available to the subscriber.

These and other objects and advantages of the present invention will become apparent to one skilled in the art to which the invention pertains from the following detailed description when read in conjunction with the appended drawings.

BRIEF DESCRIPTION OF THE DRAWINGS

FIG. 2 is a signal diagram illustrating an exemplary form of the video portion of the program signal with scramble and program ID codes as utilized in the system of FIG. 1;

FIG. 3 is a functional block diagram illustrating the central transmitting station of FIG. 1 in greater detail;

DETAILED DESCRIPTION

Figure 1:
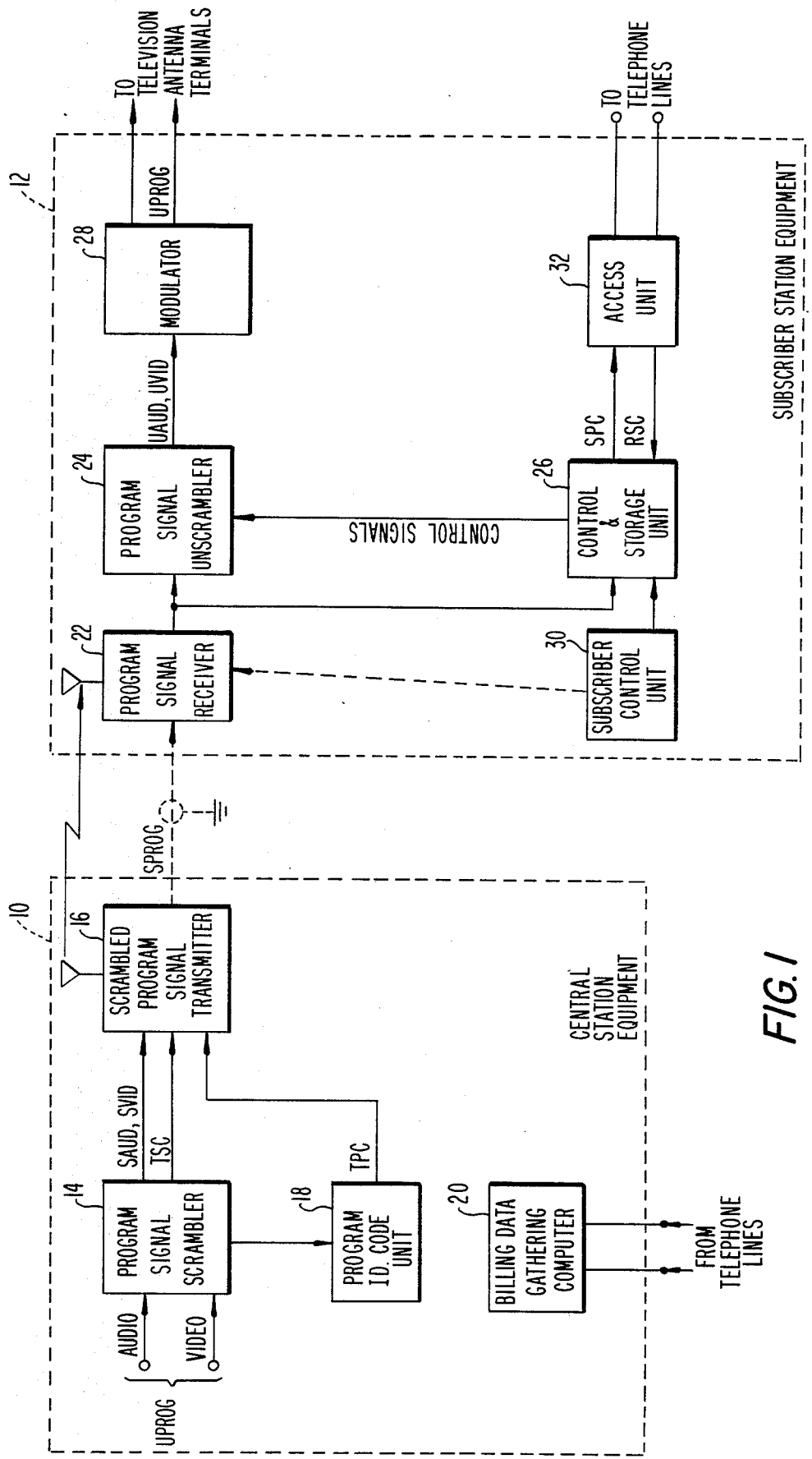
FIG. 1 is a functional block diagram illustrating a subscription or pay television system in accordance with the present invention.

Referring now to FIG. 1, the system according to the present invention generally comprises central station equipment 10 which supplies program signals in a scrambled form to subscriber station equipment 12 at each of the subscriber stations. As will be described hereinafter in greater detail, the scrambled program signal includes scrambled audio and video signals as well as various synchronizing signals and codes. The scrambled program signal SPROG is supplied to the subscribers either by conventional broadcast or cable techniques.

The audio and video signals from a conventional source such as television camera equipment are applied to a program signal scrambler 14 to produce respective scrambled audio and video signals SAUD and SVID. In addition, the program signal scrambler 14 provides a transmitted scramble code TSC for transmission with the scrambled program audio and video signals. The SAUD, SVID and TSC signals from the scrambler 14 are provided to a suitable conventional transmitter 16 for production of a scrambled program signal that includes the code signals and for transmission to subscriber stations.

A program ID code unit 18 synchronized with the scrambled video signal and scramble code provides a program code TPC for transmission with the program signals. This program ID code TPC is combined with the scrambled program video and the scrambled code for transmission to the subscriber as is described hereinafter in greater detail. In addition, the central station equipment 10 may include a billing data gathering computer 20. It should however be understood that the billing data gathering computer 20 may be located at any convenient central location and need not be located at the transmitting site.

The scrambled program signal SPROG from the central station equipment 10 is received by a program signal receiver 22 at the subscriber station and the received signal is supplied both to a program signal unscrambler 24 and to a control and storage unit 26. The program signal unscrambler 24 operates in response to control signals from the control and storage unit 26 to unscramble the incoming program signal and provide unscrambled audio and video signals UAUD and UVID to a conventional modulator 28. The modulator 28 modulates a carrier signal of an appropriate carrier frequency with the unscrambled audio and video signals and supplies the unscrambled program signal in the form of a modulated carrier wave to the television antenna terminals for use by the subscriber's television set in a conventional manner.

A subscriber control unit 30 provides subscriber control of program viewing. The subscriber control unit 30 may, for example, include one or more subscriber manipulated controls which permit the subscriber to selectively tune a conventional tuner in the program signal receiver 22 in order to select a desired program as well as to provide appropriate signals to the control and storage unit 26 indicating that the subscriber has selected a program for viewing and has thus assumed the obligation to pay that program.

The control and storage unit 26 detects code signals in the incoming scrambled program signal for unscrambling and billing purposes. In this respect, the transmitted scrambled code TSC is detected by the control and storage unit 26 and compared to a received scramble code RSC supplied to the control and storage unit through an access unit 32 and stored in the control and storage unit. The control and storage unit 26 also detects the transmitted program code TPC in the incoming program signal and stores the program code of a particular program being viewed. The stored program code SPC is then supplied on command to the access unit 32. As illustrated, the access unit 32 is connected to telephone lines which are in turn connectable through conventional telephone switching equipment to the telephone lines leading to the billing data gathering computer 20.

In operation, the audio and video program signals are supplied to the program signal scrambler 14 and are scrambled in any suitable conventional manner. For example, these signals may be scrambled in accordance with the techniques described in U.S. Pat. No. 3,824,332 through selective inversion of portions of the video signal. The scramble code TSC may be inserted into the video signal in order to permit unscrambling of the program signals at the subscriber station as is set forth in U.S. Pat. No. 3,824,332.

In addition, each program that is transmitted in a scrambled form may be identified by placing a program code TPC in the video signal during the vertical retrace interval of the signal or at any other convenient location. In this connection, the program code and scramble code may be combined with the program video at the appropriate locations by synchronizing the generation of these codes with the video synchronizing signals in any known manner such as that shown in the referenced U.S. Pat. No. 3,824,332.

The program signal transmitter 16 combines the video and code signals and transmits this combined signal together with the audio signal at an appropriate carrier frequency. The resultant video portion of the program signal may thus take the form illustrated in FIG. 2. For example, as is illustrated in FIG. 2, the successive horizontal lines of the video signal are conventionally separated by horizontal synchronization pulses and each frame of video signals is separated by a vertical retrace interval or vertical synchronization signal. During the vertical retrace interval, various equalizing and synchronization pulses are provided and it is in this interval that the scrambled and program ID codes are preferably combined with the transmitted program signal. These codes are preferably encoded in a digital form as illustrated in FIG. 2 although it should be understood that any well known coding technique such as the tone burst technique described in U.S. Pat. No. 3,824,332 may be utilized.

With continued reference to FIGS. 1 and 2, the transmitted program video signal is thus in the form of a scrambled signal (e.g., with selected frames of video information inverted) with codes inserted at appropriate locations to identify the program being transmitted and to indicate to the subscriber equipment the state of the subsequent video signal (i.e., inverted or non-inverted). The program signal receiver 22 selects a particular carrier frequency through the use of a conventional tuner and demodulates the incoming program signal to recover the audio, video and code signals.

The recovered scrambled program signal is supplied to the program signal unscrambler 24 and to the control and storage unit 26 for unscrambling and detection of the codes contained in the video portion of the program signal. The scramble codes detected in the program signal are used to generate the control signals that control the unscrambling of the program signal by the unscrambler 24. The program code in the incoming video signal is stored in a storage unit that may be selectively accessed by an access unit 32. The access unit 32 may be, for example, of the type disclosed in copending U.S. patent applications Ser. No. 683,161 filed May 4, 1976 and Ser. No. 701,033 filed June 29, 1976, both by Robert S. Block and John R. Martin.

It will be appreciated that the invention provides a relatively simple manner of subscriber billing that allows for the identification of programs actually viewed and the rapid gathering of this information on a periodic basis long after a program has been viewed. Each subscriber station is selectively accessed so that program viewing information in association with subscriber identification information is available at a central location for billing purposes. Moreover, the billing gathering computer 20 has complete control over the subscriber station equipment 12 in the sense that it can deny new scrambled codes to the subscriber station equipment on a selective basis if that particular subscriber has not paid his bill or for other relevant reasons.

Figure 4:
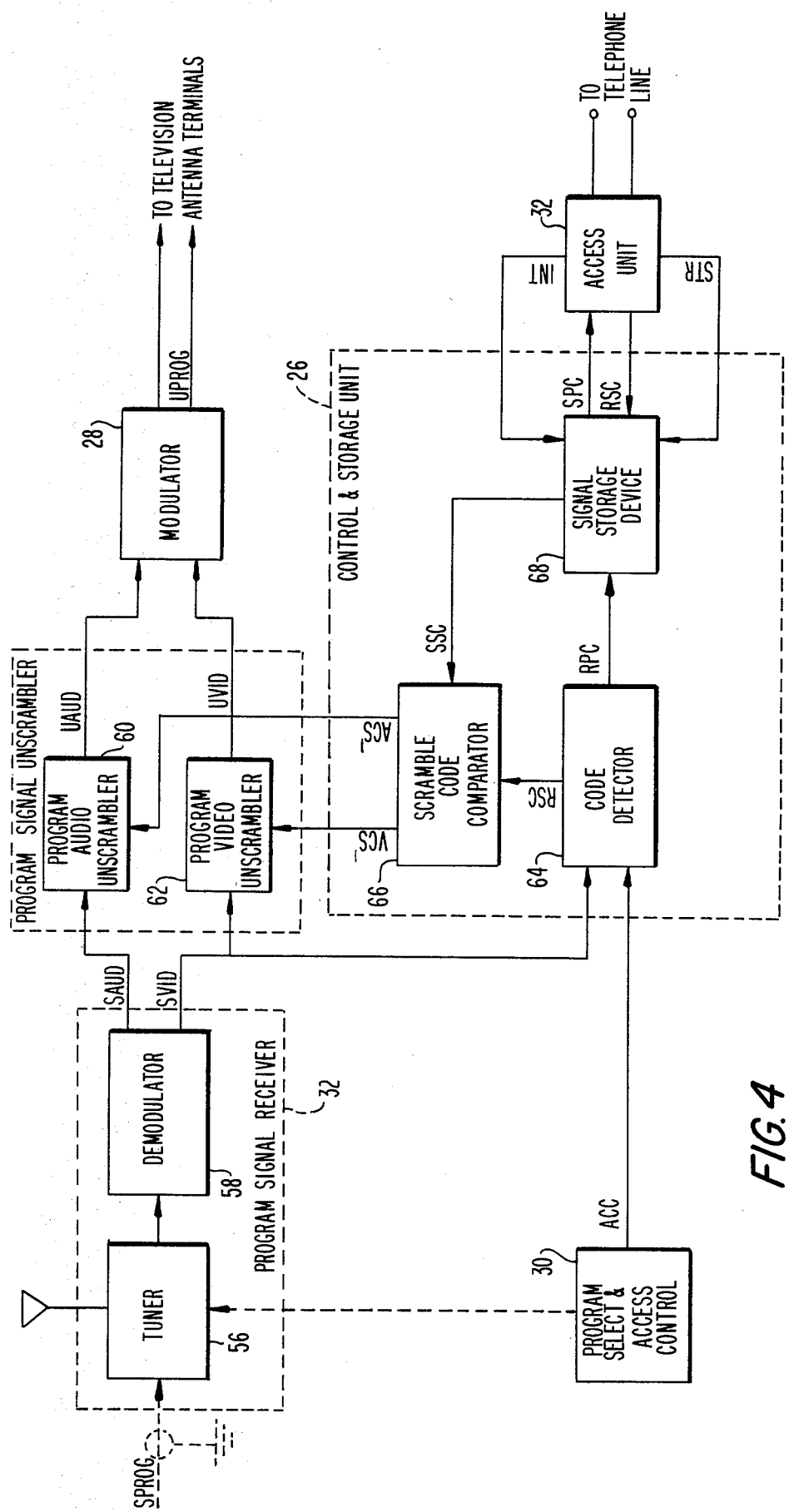
FIG. 4 is a functional block diagram illustrating the subscriber station equipment of FIG. 1 in greater detail.

To facilitate an understanding of the present invention, the central station equipment 10 and the subscriber equipment 12 are illustrated in greater detail in FIGS. 3 and 4, respectively.

Referring to FIG. 3, the central station equipment receives the unscrambled program signal UPROG including the audio and video portions. The audio portion is applied to a program audio scrambler 42 and to a video sync detector 44. The video sync detector 44 detects an appropriate synchronization pulse in the video signal, e.g., the vertical sync pulses, and supplies the sync pulse to a scramble code generator 46 and to the program ID code unit 18. The scramble code generator 46 supplies a video scramble control signal VCS to the program video scrambler 42 and an audio scramble control signal ACS to the program audio scrambler 40. The program signal is thus scrambled to produce a scrambled audio signal SAUD and a scrambled video signal SVID in a conventional manner. In addition, the scramble code TSC is generated by the scramble code generator 46 so as to identify the manner in which the program signal has been scrambled.

As was previously mentioned, the program ID code unit 18 receives the sync signal from the video sync detector 44 and generates the program code signal TPC. In this connection, a program ID code selector 48 may be provided to control the generation of a particular program code by a program ID code generator 50. Thus, the station operator can select a particular code for a particular program in this manner.

The scrambled audio and video signals together with the scrambled code and program code are supplied to the scrambled program signal transmitter 16 comprising a signal combiner 52 and conventional modulators and transmitters 54. The signal combiner 52 receives the scrambled video, scramble code and program code signals and combines these signals in a conventional manner to produce a signal such as that illustrated in FIG. 2. This combined signal is then applied to the modulators and transmitters 54 together with the scrambled audio signal for modulation of these signals onto a suitable carrier wave for transmission.

It will thus be appreciated from the diagram of FIG. 3 that the video sync detector 44 detects the appropriate synchronization pulse in the video signal in order to trigger the scramble code generator 46 and the program ID code generator 50 at appropriate times. For example, the video sync detector 44 preferably detects the vertical sync pulse during the vertical retrace interval of the video signal. This vertical sync pulse triggers the scramble code generator 46 in order to cause the program video signal to be inverted or passed uninverted at an appropriate time. In addition, the detected sync signal triggers the scramble code generator and the program ID code generator in order to synchronize the generation of the scramble code and program code signals TSC and TPC with the occurrence of the vertical retrace interval. The audio scramble control signal ACS generated by the scramble code generator 46 may be any suitable control signal and need not be synchronized to the video synchronization pulses.

The signal combiner 52 conventionally combines the video and code signals and the modulators and transmitters 54 provide appropriate modulated signals for either broadcast or cable transmission.

Referring now to FIG. 4, the program signal receiver 32 at the subscriber station may include a conventional tuner 56 and a conventional demodulator 58. The scrambled program signal is supplied to the tuner 56 and to the demodulator 58 for recovery of the scrambled audio and scrambled video signals. The scrambled video signal, of course, contains the program and scramble codes in addition to video information. Control of the tuner 56 and thus selection of a particular carrier frequency may be accomplished in a conventional manner by a control knob on the subscriber control unit 30. The control unit 30 may therefore be referred to as a program select and accept control since this control also may provide for the application of an accept signal ACC to the control and storage unit 26 as an indication that the subscriber has assumed the obligation to pay for a particular program to which the equipment is tuned.

The scrambled audio signal is supplied to a program audio unscrambler 60 and the scrambled video signal is supplied both to a program video unscrambler 62 and to a code detector 64 in the control and storage unit 26. The code detector 64, when enabled by the accept signal ACC, detects the received scramble code RSC and the received program code in the video signal. The received scrambled code is supplied to a scramble code comparator 66 and the received program code is supplied to a conventional signal storage device 68 for storage and later recall by the access unit 32.

The scramble code comparator 66 receives a stored scramble code signal SSC from the signal storage device 68 and generates the video and audio unscramble control signals VCS' and ACS', respectively. These two signals are supplied to the respective program video unscrambler 62 and the program audio unscrambler 60 in order to reconstitute the scrambled video and audio signals to their original form prior to scrambling by the program signal scrambler 14 at the central station equipment. This unscrambling process may take the form, for example of that illustrated and described in previously referenced U.S. Pat. No. 3,824,332. Thus, for example, when the received scramble code RSC is compared to the stored scramble code SSC and is identified as an invert signal, the VCS' signal causes the program video unscrambler 62 to invert the subsequent frame of video signals. Similarly, when the received scramble code is compared with the stored scramble code and is identified as a non-invert signal, the video signal is passed by the program video unscrambler 62 in an uninverted form.

The access unit 32 is connected to the telephone lines as was previously described and provides access between the billing data gathering computer 20 and the signal storage device 68. The subscriber station equipment may be accessed in any one of the various ways disclosed in the previously referenced copending patent applications of Block and Martin such as through the timed placement of a call from the access unit 32 to the computer 20 (e.g., the placement of a call on a monthly basis). Similarly, when the signal storage device 68 is full and can store no more program codes, the access unit 32 may place a call to the data gathering computer 20 to transfer billing information thereto.

In this connection, the computer 20 and access unit 32 may be connected over the telephone lines through conventional telephone switching equipment as commanded either from the access unit 32 or from the computer 20. After the connection is effected between the computer 20 and the access unit 32, various data may be transmitted over the telephone lines.

The computer 20 may, for example, initially command the access unit 32 to transmit the stored program code signals SPC from the signal storage device 68 to the computer 20. This may be accomplished in any suitable manner as, for example, by sending a code to the access unit 32 and generating an interrogate or read signal INT which causes the signal storage device 68 to supply the stored program codes SPC to the telephone lines and therefore to the computer 20. Similarly, the computer 20 may transmit a code to the access unit 32 commanding it to generate a strobe or write signal STR in order to transmit new scramble codes RSC through the access unit to the signal storage device 68. During normal operation, then, the signal storage devise may be supplied with scramble codes for one month's programs and at the end of that month new scramble codes may be supplied for the next month's programming. At the same time, the program codes stored in the signal storage device 68 may be accessed and transferred to the computer 20 so that the subscriber may be billed for actual programs viewed during the preceding month at various rates for various programs.

Figure 5:
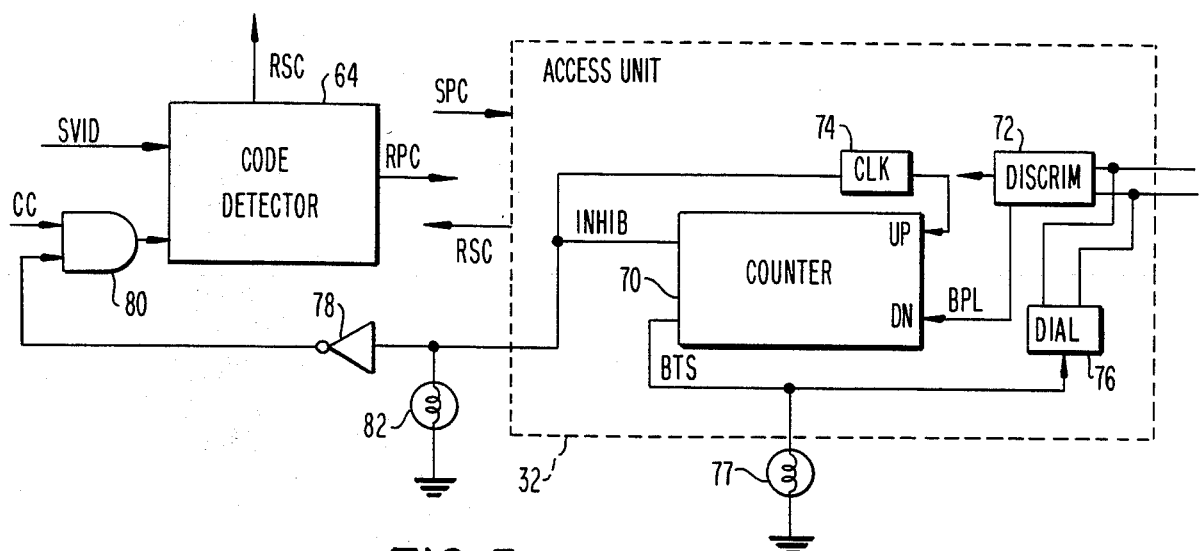
FIG. 5 is a functional block diagram illustrating an access unit with a settable clock for providing variable length billing periods.

An embodiment of an access unit which provides for variable control of the billing period is illustrated in FIG. 5. The access unit 32 includes an UP-DOWN counter 70 which comprises a settable clock and provides a signal to indicate when the computer 20 should be called to perform a billing operation. The DOWN or alternatively the PRESET input terminal of the counter 70 is connected to a discriminator 72 which transmits a billing period length signal BPL received from the computer over the telephone lines. The discriminator 72 can also transmit other signals received over the telephone lines to other circuitry in the access unit 32 and to the signal storage device 68 (e.g., the INT and STR signals). The billing period length signal BPL reduces the count in the counter by a predetermined amount or alternatively presets the counter to a predetermined count corresponding to the length of the desired billing period, e.g., one month.

The UP input terminal of the counter 70 is connected to a clock 74. It will be obvious that the frequency of the output signal of the clock 74 will be determinative of the amount the count in the counter 70 is reduced by the signal BPL to obtain the desired billing period length.

An output terminal of the counter 70, e.g., the zero count output signal, is connected with an automatic telephone dialing unit 76. After a period of time determined by the billing period length signal BPL, the count in the counter 70 will reach a predetermined value such as zero and a billing time signal BTS will be transmitted to the dialing unit 76. This enables the dialing unit 76 and causes it to place a call to the computer 20 to provide a connection between the computer 20 and the access unit 32.

Once the connection between the access unit 32 and the computer 20 is made, the previously described procedures associated with the billing operation are performed. In addition, a new billing period length signal BPL is transmitted to the access unit 32 to preset the counter 70 to a predetermined value, to establish a new billing period, and remove the billing time signal BTS. A signal lamp 77 can be connected to the counter 70 to indicate when a billing operation is taking place.

An output terminal of the counter 70 can be connected to the code detector 64 to provide an inhibit signal INHIB which prevents operation of the code detector after the termination of one billing period and prior to the beginning of the next succeeding billing period. The inhibit signal may also be connected to the clock 74 to inhibit the clock and so that the inhibit signal is maintained until the counter is again preset by the BPL signal.

Prior to generation of the billing time signal BTS, the inhibit signal INHIB is in a low state. This signal is inverted by an inverter 78 and enables an AND gate 80. A second input terminal of the AND gate 80 is connected with an output terminal of the program select and access control 30 to receive the accept signal ACC. As long as an inhibit signal is not generated, the accept signal is transmitted to the code detector 64 by means of the AND gate 80.

If, however, the count in counter 70 has reached the inhibit value and the inhibit signal INHIB is generated, the AND gate 80 will be disabled. The subscriber will not be able to actuate the code detector 64 to receive a broadcast program until the counter 70 is reset by a billing period length signal BPL from the computer. A signal lamp 82 can be connected to the output terminal to indicate that the system is in the inhibit mode.

The billing period length signal BPL can be varied by the computer to provide a means of flexible control over the amount of program material a subscriber will be able to receive and view. For example, the billing period length signal will normally set the length of the billing period to be one month, i.e., the counter will reach the predetermined count that generates the INHIBIT and BTS signals around 30 days after the BPL signal presets the counter. At the end of the onemonth billing period, the computer is dialed by means of the automatic dialing unit 76 in response to the BTS signal and the computer is fed the billing information stored in the signal storage device 68.

The computer checks to determine whether the subscriber's bill for the previous billing period has been paid. If it has, the computer sends out a billing length signal which resets the counter 70 for another one-month period and supplies the new scramble codes for the next month's programming.

If, however, the subscriber's previous bill has not been paid, the computer 20 will send out a billing period length signal BPL which resets the counter 70 for a one-week billing period, for example. In the example above, only the scramble codes for the week's worth of programming will be transmitted to the access unit 32.

After one week in the above example, the billing time signal BTS will be generated and the computer 20 will be connected to the access unit 32. The computer will again check to determine whether the bill has been paid. If it has, a billing period length signal will be transmitted by the computer to reset the billing period to terminate at the end of the one month period of which one week has elapsed. The remainder of the scramble codes for the month's programming will also be supplied.

If the subscriber's bill has not yet been paid, a new length signal (which may be zero) will be furnished by the computer. The inhibit signal INHIB will prevent the subscriber from viewing any of the televised programs until the bill has been paid, or the decoder will be given no enable codes and therefore is inhibited from decoding. The signal lamp 82 indicates that the bill must be paid before further access to the broadcast programs can be achieved.

The inhibit signal INHIB can be generated simultaneously with generation of the billing time signal BTS to prevent access to broadcast programs during billing operations and until the counter 70 is reset. Alternatively, the inhibit signal can be generated a short time after the billing time signal, e.g., one minute, to allow normal billing operations and reset to occur without interference with program access when bills have been paid promptly.

Figure 6:
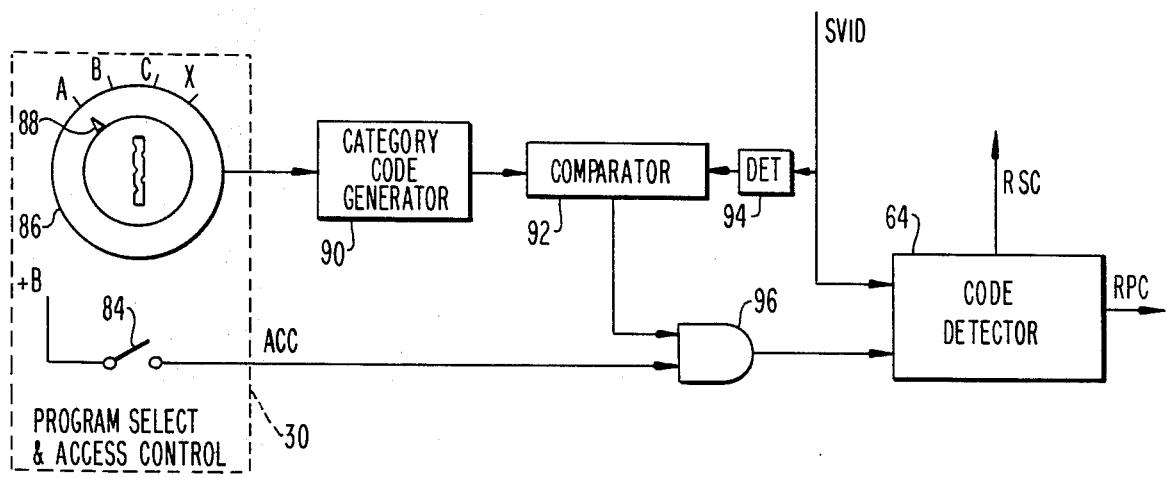
FIG. 6 is a block diagram illustrating a category selection device which can be included with the subscriber station equipment.

As a further feature of the present invention, a plurality of different programs which are categorized according to content can be selectively provided to the subscriber. One embodiment for providing such a capability is illustrated in FIG. 6.

The program access and control 30 includes a switch 84 or similar such device which allows the subscriber to indicate that a particular broadcast program is desired by generating the accept signal ACC. In addition, the control unit 30 includes a category selector knob 86. The selector knob 86 is preferably a key controlled switch which can be locked and turned to a desired category of programming only by means of a special key. The selector knob 86 includes a pointed indicator 88 which can be turned to a number of different category positions such as A, B, C, and X.

The different categories such as A, B, C and X can represent classification of the broadcast programs based upon subject matter content of the programs. For example, the classification breakdown can be as follows:

A: Suitable for viewing by the public in general;
B: Subject matter requiring patental guidance;
C: Restricted subject matter; and
X: X-rated material.

Alternatively, a category S can be set up for special interest groups, such as doctors, lawyers, etc. In such a case, the classifications could be as follows:

A: General;
B: Parental Guidance;
C: X-rated; and
S: Special interest.

Furthermore, the logic circuitry associated with the selector knob is designed so that subscribers belonging to one special interest group will not receive those intended for a different group, i.e., lawyers will not receive educational programs for doctors.

The selector knob 86 can be connected to a category code generator 90. The code generator 90 is responsive to the position of the selector knob 86 and generates a signal containing the code or codes identifying the category or categories which have been chosen as acceptable for viewing. For example, if the selector knob is set to the "A" position, a code word will be generated indicating that only A category programs are to be unscrambled. If the "B" position is selected, a code or words will be generated indicating that A or B category programs can be unscrambled. The "C" position will cause generation of a code word or words to indicate that A, B or C category programs can be unscrambled, and "X" will indicate that any of the four categories of programs are acceptable.

The output signal of the category code generator 90 is fed to a comparator 92. The comparator 92 also receives a signal identifying the category in which the received program is classified. This coded signal can form part of the program code signal TPC. For example, if the program code signal is a digital signal, the category code may be contained in the first three bits of the program code signal. Alternatively, different groups of program identification numbers can be assigned to programs of different categories. For example, programs numbered 1-200 will be "A" category programs, programs numbered 201-500 will be "B" category programs, etc. Thus, no additional data will be required to be braodcast with the program I.D. signal and the "A" position of the switch 86 will allow decoding (unscrambling) of all programs numbered 200 or below, the "B" position all programs numbered 500 or below, etc.

The category signal present in the incoming broadcast signal is detected by a detector 94 and fed as an input signal to the comparator 92. The comparator compares the two input signals and if they correspond, i.e., the category of the broadcast signal is acceptable for viewing, an enabling signal is produced at the output terminal. The enabling signal enables an AND gate 96, which transmits the accept signal ACC to the code detector 64.

The category selection feature permits selective control by the subscriber of the programs which can be viewed. Furthermore, the key lock selector knob allows parents to prevent unauthorized viewing by children of programs having sensitive subject matter.

From the foregoing description, it will be made clear that the present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. In a television system in which subscription program signals containing subscription program material are transmitted to subscribers, a program selection system comprising:

means at a location remote from the subscriber location for transmitting the subscription program signals with an associated signal indentifying the program signal as containing subscription program material in at least one of a plurality of subscriber accessible categories of subscription program material;

means at the subscriber location for receiving the subscription signals and the associated category identifying signal;

subscriber-actuated means at the subscriber location for selecting at least one category of subscription program material and producing a local category signal identifying said selected category of subscription program material;

means for comparing said local category signal and said received category identifying signal to produce a control signal for limiting selection of program material to said at least one category identified by said local category signal.

2. The system of claim 1 wherein each subscription program signal contains a scrambled video portion and is transmitted with an identifying signal unique to program material in said video portion and including means for unscrambling the video portion of the received subscription program signal in response to said control signal.

3. The system of claim 1 wherein said associated category indentifying signal is an identifying number unique to the program material in the program signal and wherein said comparing means comprises means for comparing said local category signal and said identifying number and producing the control signal in response to said number being within a range of numbers associated with said local caregory signal.

4. In a television system in which program signals containing subscription program material, and associated signals identifying the program signals as containing at least one of a plurality of categories of subscription program material, are transmitted so as to be available to all subscribers, apparatus at each subscriber location for restrictive access to the subscription program material comprising:

means for receiving a program signal and an associated category identifying signal and detecting the associated category identifying signal;

means for selecting at least one of said plurality of categories of subscription program material;

means for identifying the at least one of the plurality of categories of subscription program material in the received program signal in response to the detected category identifying signal; and, means responsive to said identifying means for restricting access to the selected category of subscription program material in the received program signal.

5. The apparatus of claim 4 wherein said identifying means comprises:

means for generating a local category signal identifying the selected one of the plurality of categories of subscription program material; and, means for comparing the detected category identifying signal and the local category signal.

6. The apparatus of claim 4 wherein said received program signal includes a scrambled video portion and wherein said access restricting means comprises means for unscrambling said video portion and enabling display thereof in response to the identification of the selected one of the plurality of categories by said identifying means.

7. A method for program selection in a television system in which subscription program signals containing subscription program material are transmitted to subscribers with associated category signals each identifying an associated program signal as containing subscription program material in at least one of a plurality of categories of subscription program material, the method comprising the steps of:

receiving a subscription program signal and an associated category identifying signal;

selecting at least one category of subscription program material at the subscriber location;

producing at the subscriber location a local category signal identifying the selected category of subscription program material; and comparing the local category signal and the received category identifying signal to produce a control signal for limiting subscriber selection of program material to said at least one category identified by said local category signal.

8. The method of claim 7 wherein the program signal is scrambled and including the step of enabling the unscrambling of the program signal in response to the control signal.

9. The method of claim 7 wherein the local category signal is produced by manually setting a control at the subscriber location to one of a plurality of positions related to different categories of program material.

* * * * *